US008328487B2

(12) United States Patent
Dupriest et al.

(10) Patent No.: US 8,328,487 B2
(45) Date of Patent: Dec. 11, 2012

(54) MECHANICAL ASSEMBLY RETENTION ELEMENT

(75) Inventors: Charles Jason Dupriest, Forth Worth, TX (US); Juan Carlos Nava, Arlington, TX (US); Craig Steven McDaniel, Argyle, TX (US); Gregory Alaimo, Amherst, OH (US); Eugene Sessa, Harisson Township, MI (US)

(73) Assignee: Nylok Corporation, Macomb, MI (US)

( * ) Notice: Subject to any disclaimer, the term of this patent is extended or adjusted under 35 U.S.C. 154(b) by 1708 days.

(21) Appl. No.: 11/500,170

(22) Filed: Aug. 7, 2006

(65) Prior Publication Data

US 2008/0031685 A1 Feb. 7, 2008

(51) Int. Cl.
*F16B 39/22* (2006.01)

(52) U.S. Cl. .......................................... 411/301; 411/303

(58) Field of Classification Search .......... 411/301–303, 411/191–194, 198, 210, 202, 203, 212, 219, 411/222, 246, 247, 324, 331, 335, 935, 937, 411/947, 967, 969, 978
See application file for complete search history.

(56) References Cited

U.S. PATENT DOCUMENTS

| 1,060,790 | A | * | 5/1913 | Rosenbrook | 411/324 |
|---|---|---|---|---|---|
| 2,392,069 | A | * | 1/1946 | Sherman al. | 411/270 |
| 2,983,534 | A | * | 5/1961 | Heller et al. | 411/542 |
| 3,316,338 | A | * | 4/1967 | Rieke | 264/267 |
| 3,938,571 | A | * | 2/1976 | Heighberger | 411/303 |
| 4,960,342 | A | * | 10/1990 | Chi | 403/24 |
| 5,047,439 | A |  | 9/1991 | Sano et al. |  |
| 5,141,375 | A |  | 8/1992 | Pollizzi |  |
| 5,262,197 | A |  | 11/1993 | Pollizzi |  |
| 5,393,182 | A | * | 2/1995 | Berecz | 411/369 |
| 5,518,768 | A |  | 5/1996 | Wallace |  |
| 6,025,019 | A |  | 2/2000 | Duffy |  |

* cited by examiner

*Primary Examiner* — Gary Estremsky
(74) *Attorney, Agent, or Firm* — R. Blake Johnston, Esq.; DLA Piper LLP (US)

(57) ABSTRACT

The present invention is directed to a retention element for retaining first and second components in assembled relationship. The first component comprises a body having first and second external surfaces and an inner wall defining an aperture extending through the body, and the second component comprises a longitudinal member having a size and configuration to permit insertion within said aperture to thereby assemble the components. The retention element comprises: an elastomeric protuberance extending into the aperture from a base adhering to the inner wall to a distal edge which spans a portion of the aperture. The protuberance also has an inside wall and an outside wall which meet at the distal edge and together define a flexible free end. Upon insertion of the second component into the aperture of the first component, the free end of the protuberance flexes in the direction of insertion such that the force required to assemble the two components is less than the force required to disassemble the two components.

20 Claims, 4 Drawing Sheets

MECHANICAL ASSEMBLY RETENTION ELEMENT

BACKGROUND OF THE INVENTION

The present invention relates to a retention device used to maintain components of a mechanical assembly in an assembled relation. The invention finds particular usefulness in retaining various components, such as collars, washers and other apertured parts, on a complimentary component, such as a stud, pin, bolt or screw.

It has been known for sometime that it is desirable to assemble various components in an early manufacturing operation and then to transport the assembly to other locations for inclusion in other machines, articles, or more complex assemblies. By way of example, it is known to assemble washers onto complimentary bolts prior to using the bolt with a mating threaded fastener in a later operation. Another example is the preassembly of crimp collars onto crimping pins prior to use of the crimp assembly in the field.

When this preassembly technique is employed, it is important to insure that the assembled components remain assembled until used in later manufacturing or fabrication operations. As a result, various retaining devices have been used in the past and are disclosed, for example, in U.S. Pat. Nos. 5,518,768 and 6,025,019.

Another prior art technique has been employed in which a hot melt resin is applied in liquid to the interior of the apertured component and allowed to cool in place to form a retention element, one that relies primarily on compressive forces to maintain the two components in assembled relation. In this prior art technique, the retention element takes the form of a small rounded lump or mound, and it has been found that a rounded retention element geometry suffers from disadvantages. Most notably, such rounded elements do not permit sufficient differential in the forces required for installation versus disassembly of the assembly components.

There is a need for a retention element with more precise dimensioning and with a configuration that permits assembly of the two components with relatively low force when compared with the force required for disassembly of the components.

SUMMARY OF THE INVENTION

The present invention is directed to a retention element for retaining first and second components in assembled relationship wherein the first component comprises a body having first and second external surfaces and an inner wall defining an aperture extending through the body and the second component comprises a longitudinal member having a size and configuration to permit insertion within said aperture to thereby assemble the components. The retention element comprises: an elastomeric protuberance extending into the aperture from a base adhering to the inner wall to a distal edge which spans a portion of the aperture; and the said protuberance also having an inside wall and an outside wall which meet at said distal edge and together define a flexible free end. Upon insertion of the second component into the aperture of the first component, the free end of protuberance engages the second component and flexes in the direction of insertion such that the force required to assemble the two components is less than the force required to disassemble the two components.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
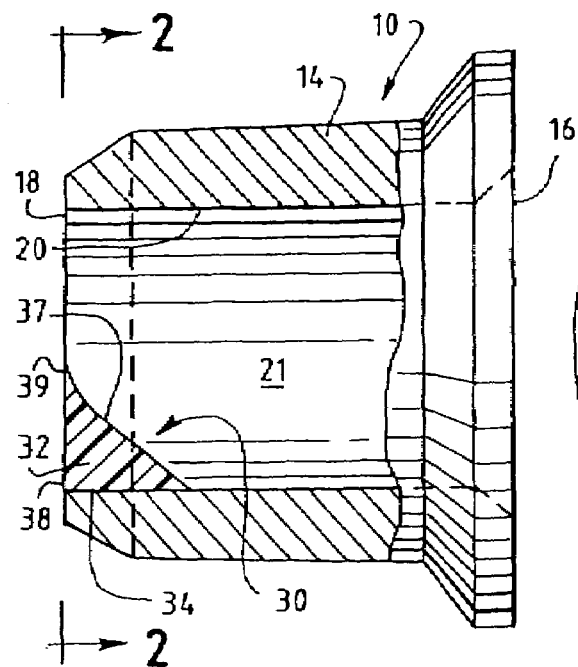
FIG. 1 is a partial cross-sectional view of the retention element of the present invention used with an apertured assembly component.
Figure 2:
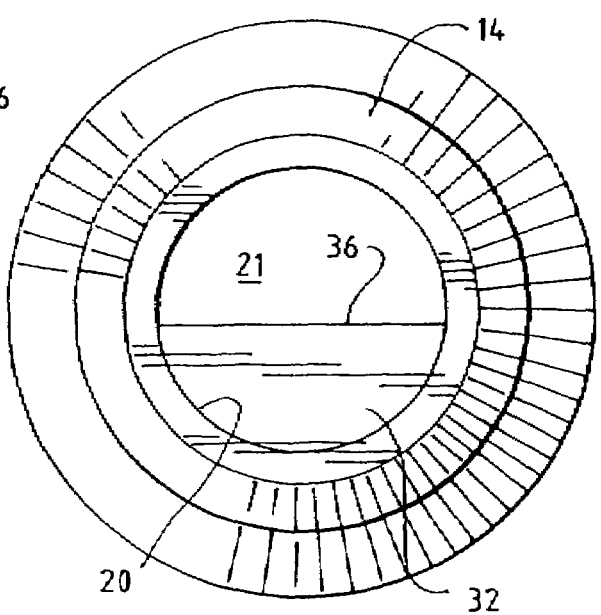
FIG. 2 is a side view of the same retention element and assembly component taken along line 2-2 of FIG. 1.
Figure 3:
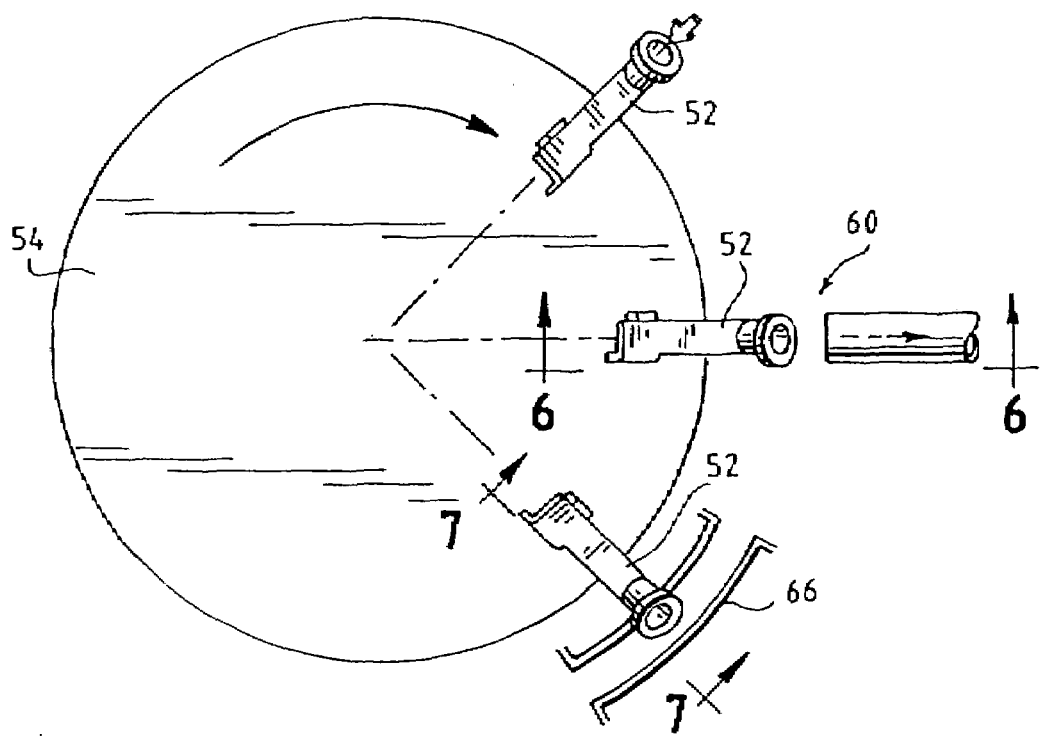
FIG. 3 is a plan view showing a machine for fabrication of the retention element of the present invention.
Figure 4:
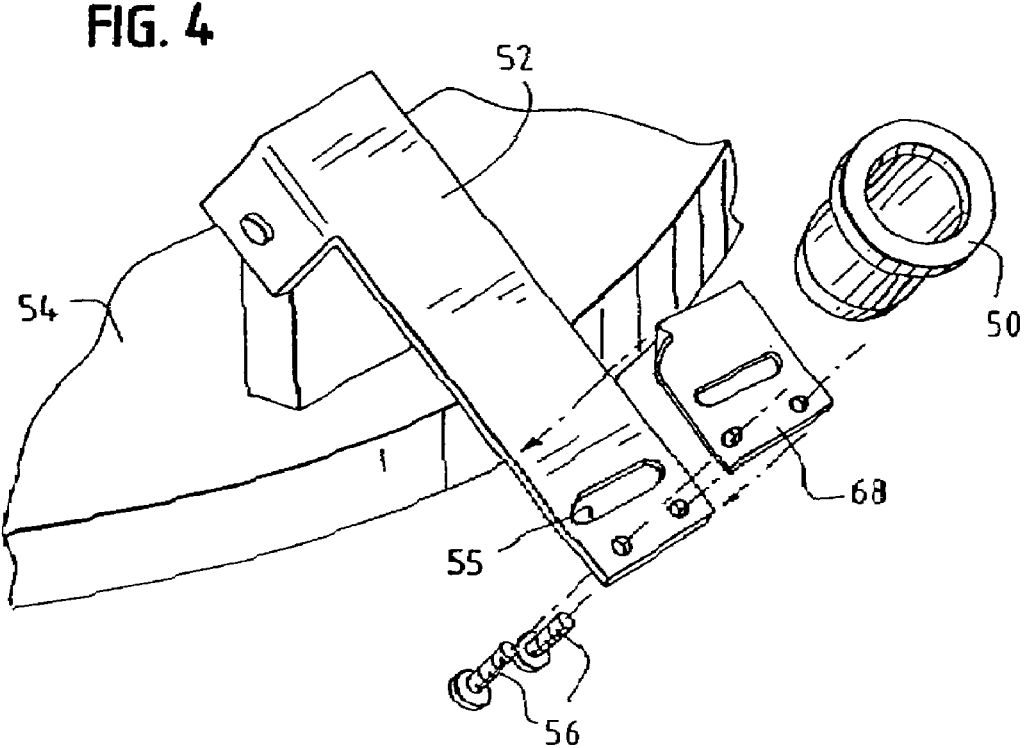
FIG. 4 is an exploded view of a machine parts fixture subassembly useful in the fabrication of the retention element of the present invention.
Figure 5:
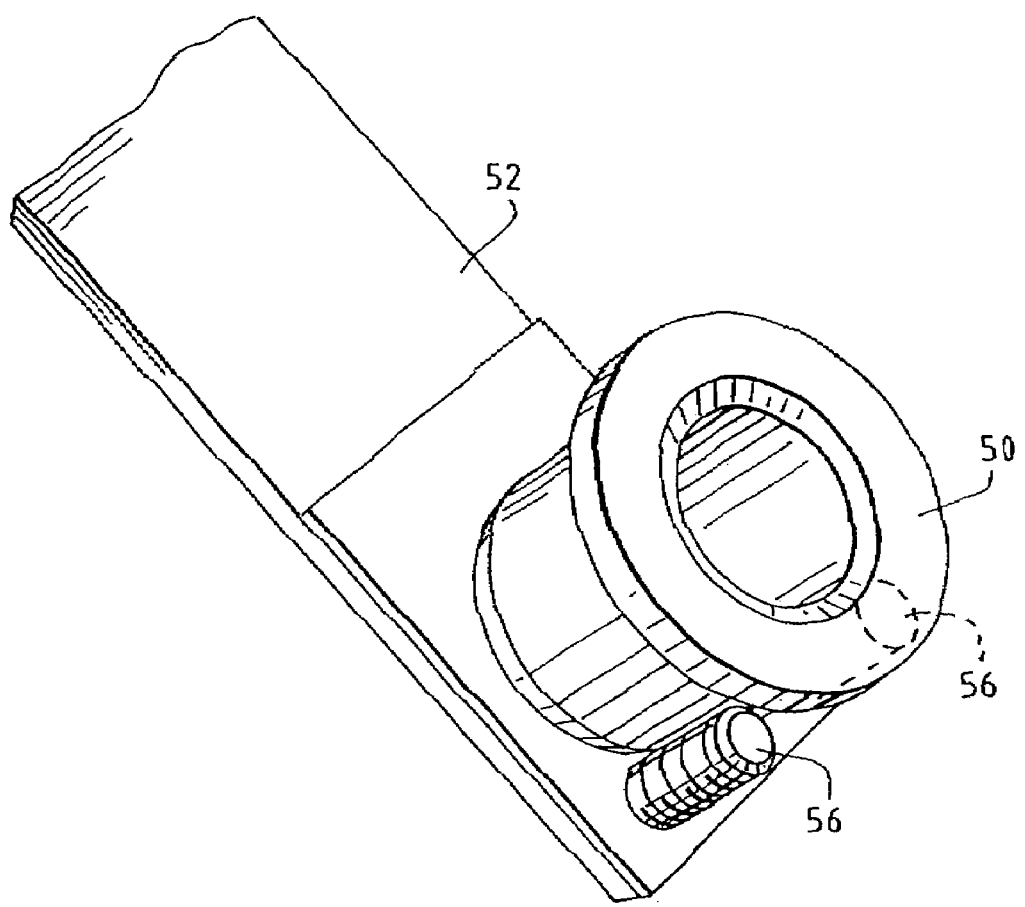
FIG. 5 is a perspective view showing the parts fixture subassembly of FIG. 4 with the apertured component mounted for fabrication of the retention element.
Figure 6:
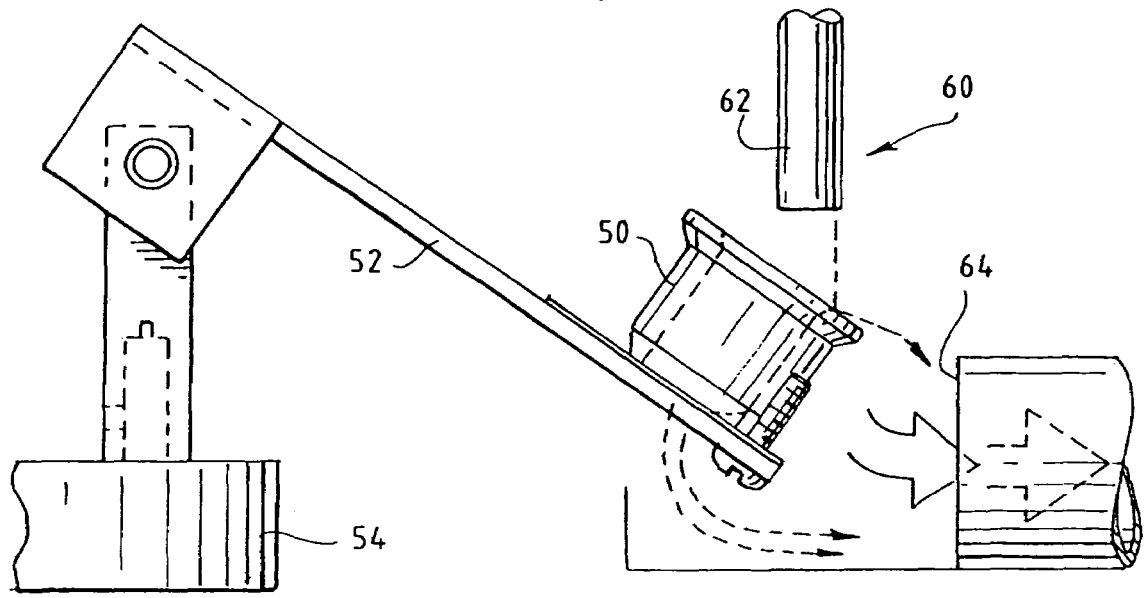
FIG. 6 is side elevation view taken along line 6-6 of FIG. 3 and showing the parts fixture and first component when aligned with a powder resin application.

With reference to the drawings and the following description of the preferred embodiments, the present invention is illustrated and described in use with a crimp collar and crimp pin. This illustrated application is merely exemplary, and the invention may be advantageously applied to many different mechanical assemblies, such as washers and bolts or other apertured components assembled to a pin, stud or other longitudinal member.

In the drawings, a first component, designated generally as 10, is shown for assembly to a second component, designated generally as 12. Component 10 is comprised of a body 14 having first and second external surfaces, 16 and 18 respectively, and an inner wall 20 which defines the aperture 21 extending through the body from the first to the second external surface. The second component 12 is a longitudinal member 22 which has a size and configuration to permit the assembly of the two components simply by inserting the longitudinal member 22 through the aperture 21.

To assist in maintaining the two components in assembled relation, the first component 10 is provided with a retention element 30 comprised of an elastomeric protuberance 32 having a base 34 fixed to the inner wall 20 and a distal edge 36. Retention element 30 is further defined by an inside wall 37 and an outside wall 38 which meet at the distal edge 36 and together define a generally flexible free end 39. Preferably, the retention element 30 is fabricated from an elastomer, such as polyolefin. A particularly well suited polyolefin is one manufactured by Rohm and Haas Chemicals, LLC, Philadelphia, Pa. under Corvel® trade name. Suitable polyolefins are disclosed in U.S. Pat. No. 5,141,375 incorporated herein by reference. Still other elastomers may be employed, such as the resin and blowing agent compositions disclosed in U.S. Pat. No. 5,141,375 also incorporated herein by reference. Materials used to form the retention element may preferably have a Shore D Hardness of about 40-50 when measured per ASTM Standard D 2240.

The outside wall 38 of retention element 30 is preferably disposed generally in the same plane as the second external surface 18 of body 14, thereby extending generally perpendicular to the axis of the aperture 21. The inside wall 37, on the other hand, is disposed at an angle relative to the inner wall 20. Although the position of the retention element 30 adjacent the second external surface 18 is preferred, it may be located adjacent the first external surface 16 or at an intermediate location along the length of inner wall 20.

Figure 8:
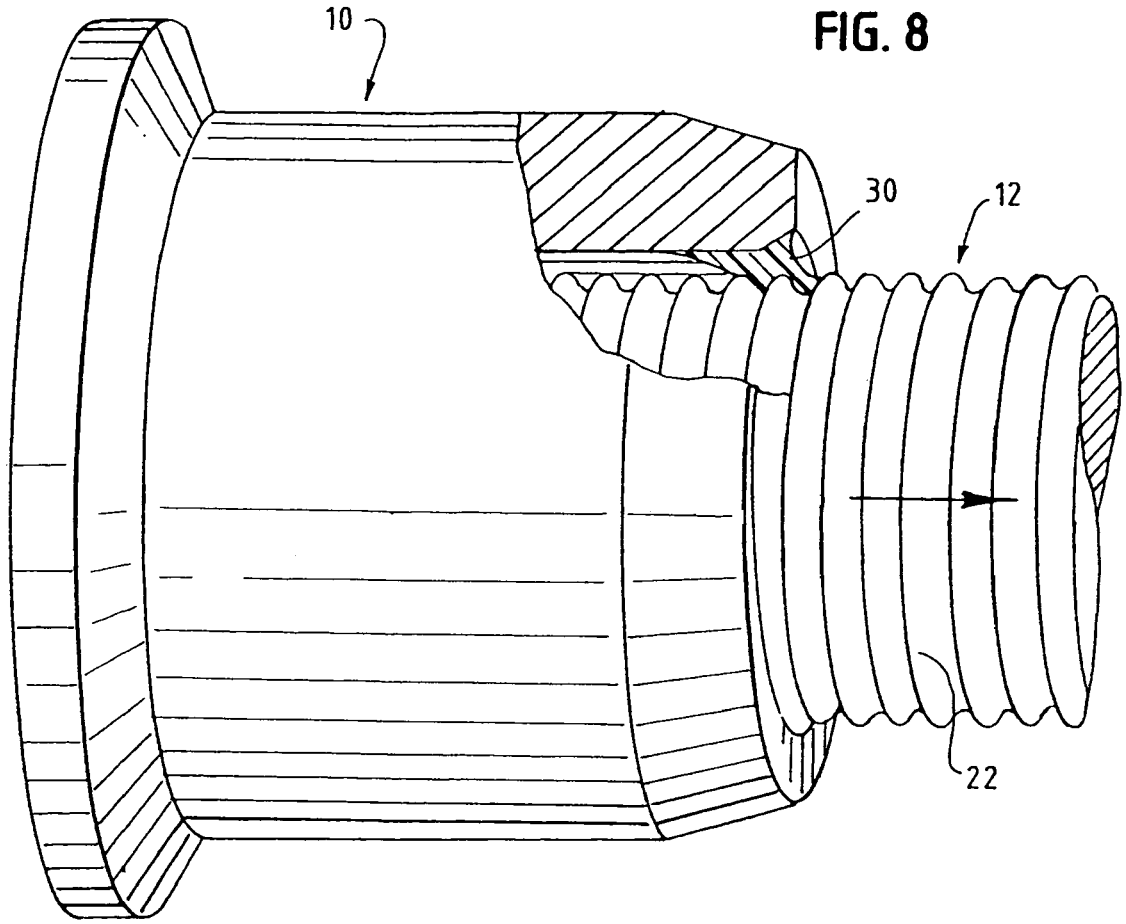
FIGS. 8 and 9 are partial cross-section views showing the interaction of the retention element of the present invention upon assembly and disassembly of the mechanical assembly components.
Figure 9:
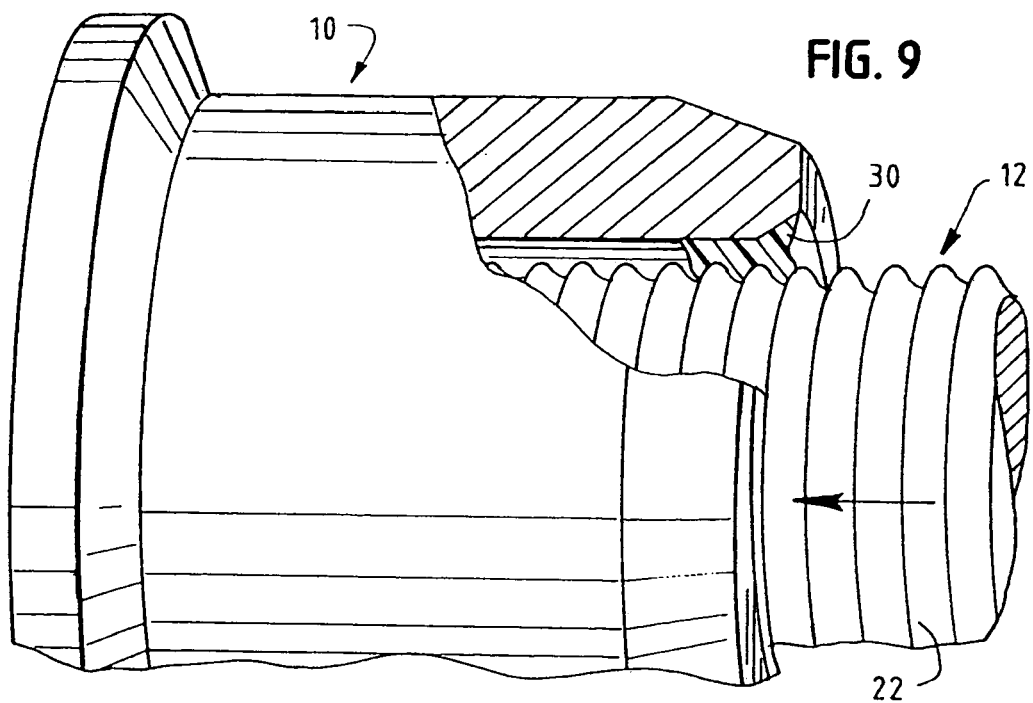

The longitudinal member 22 may have a smooth external surface, but it in many applications the external surface will have generally transverse ridges, as illustrated in FIGS. 8 and 9, or may be threaded.

When the second component longitudinal member 22 is inserted into and through the aperture 21 in the first component, the free end 39 of the retention element engages the second component and flexes in the direction of insertion, as illustrated in FIG. 8. By virtue of the size and configuration of the retention element, the insertion force necessary to assemble the two components will be measurably less than the force required to disassemble the components. For example, it has been found using a polyolefin elastomer having a Shore D hardness in the range of about 40 to 50, the insertion force may be as little as about 10% of the force required to disassemble the components. Most preferably, the assembly force is less that 5% of the disassembly force.

The difference in assembly and disassembly forces is attributable in part to the geometry of the retention element, with the outside wall being disposed generally perpendicular to the direction of insertion while the inside wall is disposed at an angle that extends in the direction of insertion. As a result, the force necessary to deflect the free end 39 during insertion, as shown in FIG. 8, is relatively low while the force necessary to compress the protuberance 32 and have the free end 39 move or fold back during disassembly of the two components, as shown in FIG. 9, is relatively high.

FIGS. 3-7 illustrate equipment useful in the fabrication of the retention element 30 on the inner wall of a conventional crimp collar 50. As shown, the collar 50 is carried by a plate 52, which comprises a fixture or a parts station. A plurality of parts stations are arranged around the circumference of a rotating carousel 54. A powder resin applicator 60, having a powdered resin discharge nozzle 62 and a powder resin reclaim vacuum port 64, is positioned adjacent to the carousel to provide a gravity driven cascading powder stream through which the collars 50 pass as the carousel rotates. Each carrier plate 52 is fabricated from a thin stainless steel sheet stock and provided with a slot 55 and a pair of stainless steel locator studs 56 so that, with the collar 50 properly positioned on plate 52, a small well is formed between the collar and the angled plate just below the slot 54. As the individual parts stations move through the powder applicator, the collar carried on each plate 52 intersects the cascading stream of powder and a small amount of the powdered resin is retained. The excess powder falls through slot 54 or off of the collar and into the vacuum port 64. With a first component of a given size, the location of slot 55 relative to the locator studs 56 will determine the height of the weir defined by the lower edge of slot 55, and in this way the well will retain a small amount of powder resin and the size and configuration of retention element 30 may be very accurately controlled.

As the carousel continues to rotate, the collar s 50 with uncured powdered resin then pass through an induction heater 66 to raise the resin to its melt temperature. Subsequent cooling of the material via water bath, stream or spray yields a retention element protuberance on the inner wall of the collar in the form as described above. A thin silicone adhesive Teflon tape 68 may be applied to the plate 52 to minimize the tendency of the elastomer to stick to the plate and to facilitate removal of the finished part at the completion of the fabrication process. A suitable tape is manufactured by CS Hyde Company under part number 21-SNL-1.5-TF.

Figure 7:
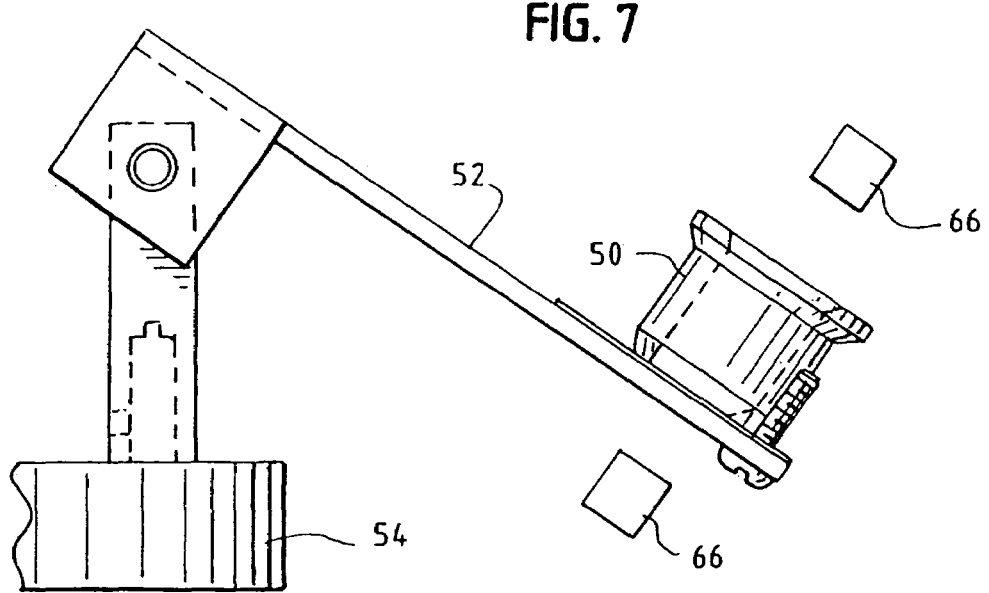
FIG. 7 is a side elevation view taken along line 7-7 of FIG. 3 and showing the parts fixture and first component aligned with an induction heater.

As illustrated in FIG. 7, it is preferred that the induction heater 66 be oriented to heat not only the collar 50 but the stainless steel plate 52, as well. This helps to insure complete melting of the powder resin even in the area immediately adjacent plate 52. For this reason, a relatively thin tape 68 should be used to permit adequate heat transfer from plate 52 to the powder resin retained within the collar.

Although the above-described preferred embodiments make use of a retention element extending for only a portion of the circumference of inner wall 21, the present invention also contemplates the use of a retention element which extends 360° or completely around the inner wall 20.

It will be appreciated by those skilled in the art that other changes and modifications can be made to the illustrated embodiments without departing from the spirit of the present invention. All such modifications and changes are intended to be covered by the appended claims.

We claim:

1. A retention element for retaining first and second components in assembled relationship wherein the first component comprises a body having first and second external surfaces and an inner wall defining an aperture extending through the body and the second component comprises a longitudinal member having a size and configuration to permit insertion within said aperture to thereby assemble the components, said retention element comprising:

an elastomeric protuberance extending into the aperture from a base adhering to the inner wall to a distal edge; and said protuberance also having an inside wall and an outside wall which meet at said distal edge and together define a flexible free end and wherein the outside wall of the protuberance is generally coplanar with one of the external surface of the first component and the inside wall of the protuberance is disposed on an angle relative to the outside wall to thereby define a taped retention element; whereby upon insertion of the second component into the aperture of the first component, said free end of protuberance engages the second component and flexes in the direction of insertion such that the force required to assemble the two components is less than the force required to disassemble the two components.

2. The retention element of claim 1 wherein said protuberance is formed by depositing a predetermined amount of powdered resin within the aperture of the first component and thereafter heating the resin to its melting temperature and cooling the melted resin to a cured elastomeric state.

3. The retention element of claim 1 wherein the protuberance comprises a material having a durometer of between about 490 and 50 Shore D per ASTM 2240.

4. The retention element of claim 1 wherein the elastomeric protuberance extends around the entire circumference of the inner wall.

5. A retention element retaining first and second components in assembled relationship wherein the first component comprises a body having first and second external surfaces and an inner wall defining an aperture extending through the body and the second component comprises a longitudinal member having a size and configuration to permit insertion within said aperture to thereby assemble the components, said retention element comprising:

an elastomeric protuberance extending into the aperture from a base adhering to the inner wall to a distal edge; and said protuberance also having an inside wall and an outside wall which meet at said distal edge and together define a flexible free end and wherein the outside wall of the protuberance is disposed generally perpendicular the axis of the first component aperture and to the direction of insertion of the second component into the first component, and the inside wall of the elastomeric member is disposed at an angle relative to the inner wall of the first component and extending in the direction of insertion; whereby upon insertion of the second component into the aperture of the first component, said free end of protuberance engages the second component and flexes in the direction of insertion such that the force required to assemble the two components is less than the force required to disassemble the two components.

6. The retention element of claim 5 Wherein said first component is a crimp collar and said second component is a crimp stud.

7. The retention element of claim 5 wherein said first component is a washer and said second component is a bolt.

8. The retention element of claim 5 wherein the protuberance is a polyolefin resin.

9. The retention element of claim 5 wherein the protuberance comprises a material having a durometer of between about 490and 50 Shore D per ASTM 2240.

10. The retention element of claim 5 wherein the second component has transverse ridges on the longitudinal member.

11. The retention element of claim 5 wherein the second component has a threaded surface.

12. The retention element of claim 5 wherein the second component has a generally smooth surface.

13. The retention element of claim 5 wherein the distal edge of the protuberance forms a straight line between two spaced points along the inner wall of the first component body.

14. The retention element of claim 5 wherein the elastomeric protuberance extends around the entire circumference of the inner wall.

15. The retention element of claim 5 wherein said protuberance is formed by depositing a predetermined amount of powdered resin within the aperture of the first component and thereafter heating the resin to its melting temperature and cooling the melted resin to a cured elastomeric state.

16. The retention element retaining first and second components in assembled relationship wherein the first component comprises a body having first and second external surfaces and an inner wall defining an aperture extending through the body and the second component comprises a longitudinal member having a size tend configuration to permit insertion within said aperture to thereby assemble the components, said retention element comprising:

an elastomeric protuberance extending into the aperture from a base adhering to the inner wall to a distal edge wherein said protuberance is formed by depositing a predetermined amount of powdered resin within the aperture of the first component and thereafter heating the resin to its melting temperature and cooling the melted resin to a cured elastomeric state; and said protuberance also having an inside wall and an outside wall which meet at said distal edge and together define a flexible free end that is, positioned within the aperture; whereby upon insertion of the second component into the aperture of the first component, said free end of protuberance engages the second component and flexes in the direction of insertion such that the force required to assemble the two components is less than the force required to disassemble the two components.

17. A retention element retaining first and second components in assembled relationship wherein the first component comprises a body having first and second external surfaces and an inner wall defining an aperture extending through the body and the second component comprises a longitudinal member having a size and configuration to permit insertion within said aperture to thereby assemble the components, said retention element comprising:

an elastomeric protuberance extending into the aperture from a base adhering to the inner wall to a distal edge; and said protuberance also having an inside wall and an outside wall which meet at said distal edge and together define a flexible free end; whereby upon insertion of the second component into the aperture of the first component, said free end of protuberance engages the second component and flexes in the direction of insertion such that the force required to assemble the two components is less than the force required to disassemble the two components wherein the assembly force is less than ten percent of the disassembly force.

18. The retention element of claim 17 wherein the assembly force is less than five percent of the disassembly force.

19. The retention element of claim 17 wherein said protuberance is formed by depositing a predetermined amount of powdered resin within the aperture of the first component and thereafter heating the resin to its melting temperature and cooling the melted resin to a cured elastomeric state.

20. The retention element of claim 17 wherein the protuberance comprises a material having a durometer of between about 490 and 50 Shore D per ASTM 2240.

* * * * *